Sept. 7, 1926. 1,599,384
W. G. O'BRIEN
METHOD OF AND MACHINE FOR MAKING A RUBBERIZED FIBROUS MATERIAL
Filed March 22, 1923 2 Sheets-Sheet 1
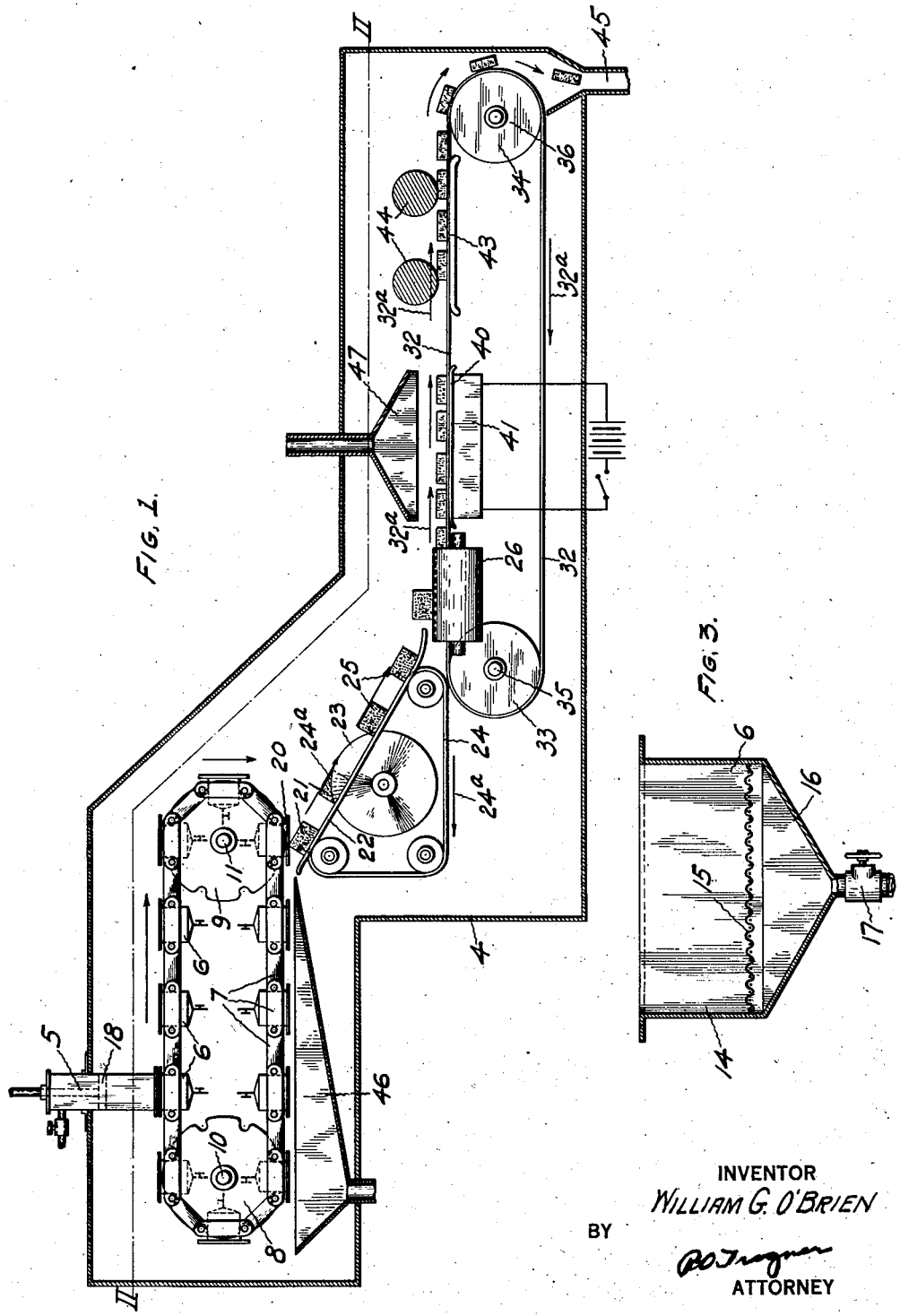
INVENTOR
WILLIAM G. O'BRIEN
BY
ATTORNEY

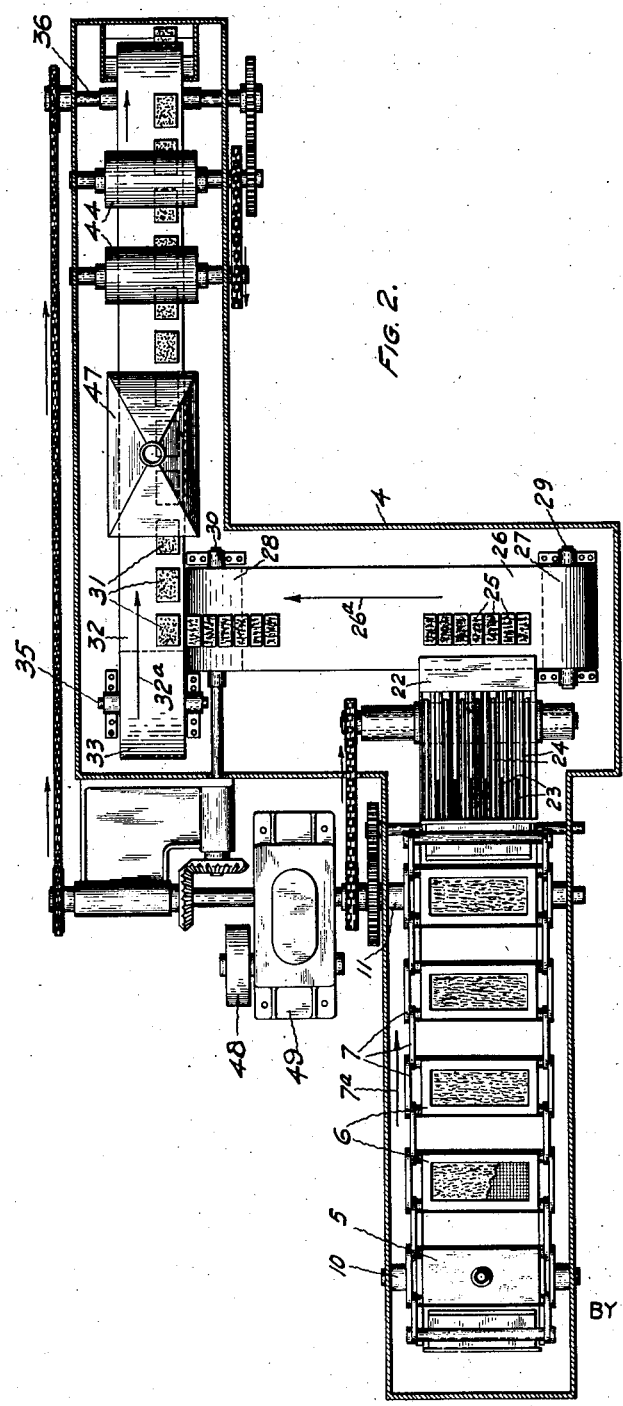

Patented Sept. 7, 1926.

1,599,384

UNITED STATES PATENT OFFICE.

WILLIAM G. O'BRIEN, OF AKRON, OHIO, ASSIGNOR TO THE GOODYEAR TIRE & RUBBER COMPANY, OF AKRON, OHIO, A CORPORATION OF OHIO.

METHOD OF AND MACHINE FOR MAKING A RUBBERIZED FIBROUS MATERIAL.

Application filed March 22, 1923. Serial No. 626,896.

My invention relates broadly to a rubberized fibrous material which may be employed as a substitute for leather, or for any other purpose for which a tough, porous, flexible, water resistant material may be employed.

More specifically my invention relates to a novel method of making such material whereby a relatively large percentage of the fibers are disposed perpendicularly to the ultimate wearing surface thereof, and to a machine for carrying out the method in question.

Heretofore, many types of artificial leather have been manufactured and used, many of which have failed to fulfill the purposes for which they were intended. One of the great difficulties has been to arrange the fibers so as to secure the maximum amount of wear therefrom and to prevent scuffing of the material formed thereby. Another feature which has very seriously limited the capacities in which these materials may be employed is the fact that all of these products have been nonporous.

By my invention I provide a means of producing a material in which the aforementioned disadvantages are overcome.

For a better understanding of my invention reference may be had to the accompanying drawings of which:

Fig. 1 is a cross-sectional view illustrating the machine which I employ in practising my invention;

Fig. 2 is a cross-sectional view of the machine illustrated in Fig. 1, the section being taken along the line II—II thereof; and Fig. 3 is a cross-sectional view of one of the details of my invention.

My present invention is concerned chiefly with a method of and a machine for handling a rubberized fibrous product after the fibers thereof have been provided with their individual coats of rubber. However, in order to make the material, it is necessary that certain other manufacturing steps, or the equivalent thereof, be practised in order to produce a high grade material. Briefly, one method of producing such material is as follows:

Jute, hemp, cotton, asbestos or other fibrous materials of like character, are first cut into relatively small pieces and dyed a color depending upon the use for which the product is ultimately to be employed. The shredded fibrous material may then be passed into a Claflin beater and beaten for a period of 15 to 30 minutes, after which that portion thereof that is sufficiently beaten is removed therefrom by means of a rotary pulp screen. The screened particles, suspended in the water in which they were beaten, then pass into a fiber straining device of any desired type such for example, as the ordinary decker, and the wet fibers are disposed upon a travelling belt or carrier. After passing between compressing rolls, which remove a considerable portion of the liquid contained within the fibers, the belt carries the material into a heated chamber or still. In this chamber the fibrous material is subjected to a bath of toluol or other suitable rubber solvent which enters the fibers.

By steam distillation, the water, together with a portion of the toluol is then vaporized, thus causing the fibers to leave the heated chamber wet with toluol, but entirely dehydrated. On passing from this chamber the material is again compressed so as to remove any excess amount of toluol, which is drained back into the distilling chamber. After the excess toluol has been removed from the fibers they are carried, still on the same belt, into a second Claflin beater in which they are reduced to the desired consistency, which comprises beating them so as to separate individual fibers without breaking or injuring them.

From this beater the fibers pass into a precipitating tank. The fibers, previously beaten and well separated, are thoroughly mixed in a liquid consisting of rubber in solution in toluol or other suitable rubber solvent. Usually a quantity of rubber precipitant is also present in this mixture, but the solvent predominates. The rubber should be treated with hydrogen sulphide and sulphur dioxide while in solution before the addition of the fibers and rubber precipitant. The interaction of these gases produces a complete cure after an interval of time.

The rubber is then precipitated upon the fibers in any desired manner. This may be accomplished by the addition of a sufficient quantity of rubber precipitating agent, such as alcohol, to render the precipitating content of the mixture predominant, or by adding a somewhat smaller quantity of precipitant and lowering the temperature of the mixture.

After precipitation, the rubber coated fibers, wet with the mixture of toluol and alcohol, and impregnated with the hydrogen sulphide and sulphur dioxide, are permitted to stand for a short period of time, such for example as 40 to 60 minutes, in order to produce jellation thereof. The product is now in condition to be admitted to a machine particularly adapted for practicing my invention.

Referring to the drawings for a detailed description of my invention, I show a machine totally enclosed and supported from a casing 4, which serves to prevent the loss of the various liquids and vapors employed during the course of manufacture of the product. At the forward end of the machine is disposed a container 5, having relatively high side walls, but having no bottom. This container projects through the casing 4 and is supplied with the rubber coated fibers held in suspension in the alcohol-toluol mixture made as previously described. Adjacent the lower end of the container 5 are disposed a plurality of movable bottom members or pans 6, which are supported and moved by a carrier mechanism 7 composed of links. This carrier is intermittently moved in the direction indicated by the arrow 7ª by means of a front sprocket wheel 8 and a rear sprocket wheel 9 mounted upon shafts 10 and 11, respectively, and serve to move the pan members 6 into and out of engagement with the lower portion of the container 5. The pan members 6, as best illustrated in Fig. 3, each consist of a container 14 of exactly the same configuration as the container 5 and having a bottom portion consisting of a screen 15 of relatively fine mesh. The bottom 16 of the pan 6 is inclined and is provided at the center thereof with a valve 17 which may be opened to permit the passage of the liquid therethrough.

In operation, the rubber coated fibers, suspended in a liquid, are admitted to the container 5 while one of the members 6 is disposed in engagement therewith, the valve 17 being closed. After the container 5 is entirely filled the supply of liquid thereto is cut off. The valve 17 is then opened, permitting the liquid in which the fibers are suspended to drain through the screen 15 and causing the fibers to be collected thereon. Owing to the relatively slow settling of the fibers they arrange themselves substantially parallel to the screen 15 and in an entirely natural felted relationship. A plunger or piston member 18, disposed within the container 5 is moved so as to compress the fibrous mass collected on the screen slightly. This force, being in a plane normal to the plane in which the fibers naturally arrange themselves, moves the fibers into closer relationship with each other and insures that the entire fibrous content of the container 5 is disposed within the pan 6 which is in engagement therewith. The shafts 10 and 11 are then moved to disengage the pan member 6, which has been filled from the container 5, and the next succeeding pan member is moved into engagement therewith.

The liquid continues to drain from the wet material disposed upon the screen 15 at a decreasing rate until all of the liquid which will drain therefrom is gone. By the time this has occurred the container 5 has been moved, by the intermittent motion of the shafts 10 and 11, to such position that it is on the lowermost side of the sprocket wheel 9, as indicated at 20. The fibrous material then falls by gravity from the pan member 6 in the form of a block, as indicated at 21, upon an inclined apron member 22.

The apron member 22 is provided with a plurality of spaced slots through which extend a similar number of rotatable knives 23, mounted upon a rotatable shaft by means of which they are driven. The blocks 21 slide down the inclined apron 22, partially by force of gravity, and partially carried by a plurality of narrow driven belts 24, which move between the knives 23 in the direction indicated by the arrows 24ª, and is sliced by the knives 23 into a number of sections 25 of equal thickness. Continued movement down the inclined apron 22 causes the various sections 25 of the block 21 to be deposited upon a transversely moving belt 26, as best illustrated in Fig. 2. The belt, 26, which moves in the direction indicated by the arrows 26ª is mounted upon rollers 27 and 28 which are mounted upon shafts 29 and 30 respectively. The movement of the belt 26, which may be continuous, is transverse to the movement of the blocks 21 while carried by the pan members 6 or while on the inclined apron 22.

When the sections 25 of the fibrous material pass over the pulley 30, they fall, one by one, as indicated at 31 upon a belt 32, which moves in a direction indicated by the arrows 32ª, transverse to the belt 26 and parallel to the carrier member 6. The belt 32 is mounted upon a forward roller 33 and a rear roller 34 which are mounted upon shafts 35 and 36 respectively. The movement of the belt 32 is continuous. The belt 32 carries the sections 25, at a low rate of speed, over a surface 40, which is heated by an electric heating element 41, disposed in engagement therewith. The member 40 serves to heat the sections 25 so as to cause evaporation of the alcohol and toluol which may be contained within the rubber coated fibers of the material. This leaves the material in a dry condition. As the rubber has not yet had sufficient time to be completely cured, it will retain any form or thickness to which it is compressed.

After passing over the heated member 40, the belt 32 carries the members over a compression plate 43, which cooperates with oppositely disposed rollers 44 for compression of the sections 25 to the desired thickness. Instead of employing the heater member 41, the sections 25 may be washed successively with baths of increasing percentages of alcohol, so as to remove therefrom the toluol, which is very undesirable in the finished product, and the product afterwards heated and compressed to expel the alcohol therefrom. After sections 26 have been suitably compressed they pass over the roller 34 from the container 4 by dropping through a suitable exit 45, after which they are ready to be cut to desired size and shape.

It will be observed that the fibrous mat is cut by the knives 23 in planes normal to those in which the fibers arrange themselves. Also, that the rolls 44 and cooperating pressure plate 43 exert a pressure on the mat in a direction parallel with the planes in which the fibers are arranged. This serves to cause the individual fibers, which were already compressed in a direction normal thereto by the member 18, to kink and buckle, thus causing them to intertwine and interlace into a more perfect felted mat.

By totally enclosing the machine, substantially 100% of the solvent and precipitant employed is recovered. Beneath the members 5 is disposed a receptacle 46 which serves to collect the liquid by which the fibers are suspended when first placed within the container. Over the heated plate 40 is disposed a shield 47, which serves to collect the vapors which arise from heating the fibrous sectors. These vapors are condensed and used again and again.

The machine is driven from any suitable source of power, not shown, by means of a pulley 48 which drives the belts 7, 24, 26 and 32, the knives 23, and the rollers 44 through a suitable speed changing device 49 and its cooperating transmission mechanisms.

As the method which I employ in practicing my invention has been described in connection with the machine, it is not described separately.

Although I have described but a single complete method of practicing my invention and have illustrated and described but a single machine adapted for the same purpose, it will be obvious to those skilled in the art that it is not so limited but that various minor modifications and changes may be made therein without departing from the spirit of my invention or from the scope of the appended claims.

What I cliam is:—

1. A machine for making a fibrous material which comprises means for straining fibers from a liquid in which they are suspended and arranging them in matted relationship, means for cutting the product into layers of the desired thickness, and means for drying the layers individually.

2. A machine for making a fibrous material which comprises means for straining fibers from a liquid in which they are suspended and arranging them in matted relationship, means for cutting the product into layers of the desired thickness, and means for drying and compressing the layers individually.

3. A machine for making a fibrous material which comprises means for straining fibers from a liquid in which they are suspended and arranging them in felted relationship in blocks, means for cutting the blocks into sections, and means for drying and compressing the individual sections of each block successively.

4. A machine for making a fibrous material which comprises means for straining fibers from a liquid in which they are suspended and arranging them in adjacent parallel planes into blocks, means for cutting the blocks into sections along planes normal to the fibers, and means for drying and compressing the sections individually.

5. A machine for making fibrous material in blocks which comprises a container having relatively high side walls and an open bottom, and a plurality of movable containers each having relatively low non-porous side walls and a bottom composed of screen of relatively fine mesh, said last mentioned containers being adapted to be removably and securely fastened to the lower end of the first mentioned container.

6. A machine for making fibrous material in blocks which comprises a container having relatively high sidewalls and an open bottom, and a plurality of movable containers having foraminous bottom members and adapted to be held in engagement with the lower end of said container and to receive a quantity of fibrous material therefrom, and means for moving said fibrous material and the supporting bottom member away from said container and for moving another foraminous bottom member into engagement therewith.

7. A machine for making fibrous material in blocks which comprises a container, and a pluraility of foraminous bottom members therefor mounted upon a movable carrier member, said carrier member serving to intermittently move said bottom members into and out of engagement with said container.

8. A machine for making fibrous material in blocks which comprises a container, a plurality of foraminous bottom members therefor mounted upon a movable carrier member, said carrier member serving to intermittently move said bottom members into and out of engagement with said container, and means for admitting to said container a quantity of liquid having fibers suspended therein during the periods that the bottom members are in engagement therewith and for causing the liquid to drain through the foraminous bottom members and the fibers to be strained from the liquid thereby.

9. A machine for making fibrous material which comprises means for felting said fibers and arranging them into large blocks, means for cutting said blocks into sections comprising a plurality of disc knives mounted in spaced relation upon a rotatable shaft, an apron member provided with a plurality of spaced parallel slots through which said knives project, and means for moving said blocks over said apron and into engagement with said knives.

10. A machine for making fibrous material comprising a plurality of movable containers, means for depositing a fibrous material in said container, an inclined apron provided with a plurality of spaced parallel slots, a plurality of rotatable knives projecting through said slots, and means for causing said fibrous material to be deposited by said containers on said inclined apron so as to be moved to said knives and be cut into sections thereby.

11. In a machine for making a fibrous material in the form of blocks, a plurality of rotatable knives adapted to cut said blocks into sections, a movable carrier member adapted to feed said blocks to said knives, and means for carrying away the sections from the knives comprising a carrier member movable in a direction transverse to the direction of movement of the blocks on the first mentioned carrier member and between the knives.

12. In a machine for making a fibrous material in the form of blocks, a plurality of rotatable knives adapted to cut said blocks into sections, a movable carrier member adapted to feed the blocks to said knives, and means for carrying away the sections from the knives comprising a carrier member movable in a direction parallel to the axis of the knives, a third carrier member movable in a direction transverse to said second carrier member and adapted to carry said sections through a drying and a compressing chamber, said second carrier member being adapted to receive the sections of fibrous material from the rotatable knives and to deposit said sections on the third carrier member individually.

13. A machine for making a fibrous material which comprises means for straining fibers from a liquid in which they are suspended and arranging them in matted relationship, means for cutting the product into layers of the desired thickness, and a plurality of means for compressing the product in two directions normal to each other.

14. A machine for making a fibrous material which comprises means for straining fibers from a liquid in which they are suspended and arranging them in matted relationship, means for cutting the product into layers of the desired thickness, and a plurality of means for compressing the product in two directions.

15. The method of making articles composed of fibrous material which comprises depositing a quantity of rubber coated fibers on a screen in adjacent parallel planes, and cutting the resulting mass along planes normal to the fibers.

16. The method of making articles composed of fibrous material which comprises so straining a quantity of liquid having rubber coated fibers in suspension through a screen as to form a relatively thick mat having the fibers thereof disposed substantially parallel to the screen, and cutting said mat into sections along planes perpendicular to said screen.

17. The method of making articles composed of fibrous material which comprises so straining a quantity of liquid having rubber coated fibers in suspension through a screen as to form a relatively thick mat having the fibers disposed substantially parallel to the screen, cutting said mat into sections along planes perpendicular to said screen, and compressing said sections.

18. The method of making articles composed of fibrous material which comprises so straining a quantity of liquid having rubber coated fibers in suspension through a screen as to form a relatively thick mat having the fibers disposed substantially parallel to the screen, cutting said mat into sections along planes perpendicular to said screen, removing the rubber solvent from the fiber coatings, and compressing the sections.

19. The method of making articles composed of fibrous material which comprises so straining a quantity of liquid having rubber coated fibers in suspension through a screen as to form a relatively thick mat having the fibers disposed substantially parallel to the screen, cutting said mat into sections along planes perpendicular to said screen, removing the rubber solvent from the fiber coatings by heating, and compressing the sections.

20. The method of making articles composed of fibrous material which comprises so straining a quantity of liquid having rubber coated fibers in suspension through a screen as to form a relatively thick mat having the fibers disposed substantially parallel to the screen, cutting said mat into sections along planes perpendicular to said screen, and drying and compressing the sections.

21. The method of making articles composed of fibrous material which comprises disposing a mass of fibers in adjacent parallel planes, cutting said mass into sections along planes normal to the fibers, and compressing the sections normally to the planes of the cut surfaces.

22. The method of making articles composed of fibrous material which comprises disposing a mass of fibers in adjacent parallel planes, cutting said mass into sections along planes normal to the fibers, and compressing the fibrous sections perpendicularly to the direction of the fibers.

23. The method of making articles composed of fibrous materials which comprises disposing a mass of fibers in adjacent parallel planes, cutting said mass into sections along planes perpendicular to the fibers and compressing the fibers in a direction normal to the planes of the laminated fibrous structure.

In witness whereof, I have hereunto signed my name.

WILLIAM G. O'BRIEN.